United States Patent
Buchanan et al.

(10) Patent No.: US 9,546,695 B2
(45) Date of Patent: Jan. 17, 2017

(54) HUB-BASED DRIVE COUPLING MECHANISM FOR A FUSER BACKUP MEMBER, AND METHODS OF USING SAME

(71) Applicant: Lexmark International, Inc., Lexington, KY (US)

(72) Inventors: Jeffery James Buchanan, Lexington, KY (US); Alexander J Geyling, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/142,480

(22) Filed: Apr. 29, 2016

(65) Prior Publication Data

US 2016/0299462 A1    Oct. 13, 2016

Related U.S. Application Data

(63) Continuation of application No. 14/839,027, filed on Aug. 28, 2015, now Pat. No. 9,341,996.

(60) Provisional application No. 62/145,020, filed on Apr. 9, 2015.

(51) Int. Cl.
| | |
|---|---|
| *G03G 15/20* | (2006.01) |
| *F16D 3/50* | (2006.01) |
| *F16H 55/17* | (2006.01) |
| *F16D 3/205* | (2006.01) |

(52) U.S. Cl.
CPC .............. *F16D 3/50* (2013.01); *F16D 3/2052* (2013.01); *F16H 55/17* (2013.01); *G03G 15/20* (2013.01); *G03G 2221/1639* (2013.01)

(58) Field of Classification Search
CPC .......... F16D 3/50; F16D 3/2052; F16H 55/17; G03G 15/20; G03G 2221/1639
See application file for complete search history.

(56) References Cited

U.S. PATENT DOCUMENTS

| | | | | |
|---|---|---|---|---|
| 3,396,556 | A | * 8/1968 | Giegerich | ................. F16D 3/50 464/73 |
| 3,920,318 | A | * 11/1975 | Frezzolini | .............. G03B 19/18 352/191 |
| 4,162,829 | A | 7/1979 | Cook et al. | |
| 4,357,137 | A | * 11/1982 | Brown | ...................... F16D 1/06 464/150 |
| 5,943,913 | A | 8/1999 | Fenelon | |

(Continued)

OTHER PUBLICATIONS

International Search Report and Written Opinion of the International Searching Authority for PCT application PCT/US2016/026764, May 17, 2016.

*Primary Examiner* — Ryan Walsh

(57) ABSTRACT

A hub-based drive coupling mechanism for a fusing assembly, including a gear operatively coupled to a motor; a hub member; and a backup roll having a shaft rotatably coupled to the gear via the hub member, the gear including an outer cylindrical portion having a plurality of tabs disposed along an inner surface thereof, the hub member including an annular portion having a plurality of protrusions radially extending therefrom, and the backup roll shaft having a pin member. When the drive gear is rotated, the plurality of tabs of the drive gear directly contact the plurality of protrusions of the hub member to cause the hub member to rotate and the plurality of protrusions of the hub member directly contact the plurality of segments of the pin member to cause the shaft to rotate.

20 Claims, 9 Drawing Sheets

(56) References Cited

U.S. PATENT DOCUMENTS

| | | |
|---|---|---|
| 6,574,446 B2 | 6/2003 | Kitayama |
| 9,341,996 B1* | 5/2016 | Buchanan .............. G03G 15/20 |
| 2005/0229728 A1 | 10/2005 | Otsuki |
| 2008/0240796 A1 | 10/2008 | Morioka et al. |
| 2011/0058851 A1 | 3/2011 | Okabe |
| 2014/0369745 A1* | 12/2014 | Nakagawa ................ F16D 3/50 |
| | | 403/361 |
| 2016/0146262 A1* | 5/2016 | Kogure .................... F16D 3/12 |
| | | 180/444 |

* cited by examiner

HUB-BASED DRIVE COUPLING MECHANISM FOR A FUSER BACKUP MEMBER, AND METHODS OF USING SAME

CROSS REFERENCES TO RELATED APPLICATIONS

The present application is a continuation application of U.S. patent application Ser. No. 14/839,027, filed Aug. 28, 2015 and entitled, "Hub-based Drive Coupling Mechanism for a Fuser Backup Member, and Methods of Using Same," which itself is related to and claims priority under 35 U.S.C 119(e) from U.S. provisional application No. 62/145,020, filed Apr. 9, 2015, entitled, "Hub-based Drive Coupling Mechanism for a Fuser Backup Member and Methods of Using Same." The content of both applications is hereby incorporated by reference herein in their entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to a drive mechanism for a fuser assembly in an imaging device, and particularly to a drive mechanism for a fuser backup member that allows for an amount of reversing of the drive gear for opening the fusing nip of the fuser assembly without reversing the rotation of the backup member.

2. Description of the Related Art

To simplify the design reduce cost, some fuser assemblies for electrophotographic imaging devices, such as laser printers or copiers, utilize only one motor for operating the fuser assembly. For a single motor fuser, the motor has two functions. One function is to run or operate the fuser in the process direction during printing to effectuate toner fusing, by driving the backup roll and exit rolls in the fuser. A second function is to open and close the fusing nip and exit nip. Fuser nip opening and closing may be achieved by turning the motor in the reverse process direction, relative to the rotational direction for moving sheets of media during a fusing operation. In earlier belt-based fuser designs with the backup roll gear fixed to the backup roll shaft, when the fuser was driven in the reverse direction to open or close the nip, the backup roll would also rotate and rub against the fuser belt. This rubbing in the reverse direction was not desirable since debris on the surface of the backup roll was seen to scratch the surface of the belt and backup roll when they are not turning together.

Some prior designs included a one-way clutch introduced between the backup roll drive gear and the backup roll shaft. When driving the drive gear in the process direction, the one-way clutch would engage the backup roll shaft and turn the backup roll. When driving in the reverse direction, the one-way clutch releases and allows the drive gear to turn freely on the backup roll shaft. Despite the successful operation of this design, a disadvantage is that it is relatively expensive and increases the overall price of the fuser.

SUMMARY

Example embodiments of the present disclosure overcome shortcomings in existing drive mechanisms and satisfy a need for a cost-reduced mechanism for reversing the backup roll drive gear for nip opening/closing in a fuser assembly, which includes a hub-based drive coupling mechanism allowing a backup roll drive gear to initially freely rotate without rotating the backup roll.

According to an example embodiment, there is disclosed a fuser assembly including a heat transfer member; a rotatable backup member disposed adjacent the heat transfer member and including a shaft; and a drive coupling mechanism for the rotatable backup member. The drive coupling mechanism is hub-based and particularly includes a drive gear having an inner cylindrical portion; a hub member including an annular portion for disposal around the inner cylindrical portion of the drive gear and slidably engaging therewith; and a pin member secured to the shaft of the rotatable backup member. The drive gear further includes a plurality of tabs extending along an inner surface of an outer cylindrical portion defining a recess thereon, while the hub member has a plurality of protrusions extending in a radial direction along an outer surface of the annular portion. Each of the plurality of tabs and each of the plurality of protrusions are arranged opposite from another tab and protrusion, respectively, such that when the drive gear is rotated, the plurality of tabs of the drive gear directly contact the plurality of protrusions of the hub member to cause the hub member to rotate and the plurality of protrusions of the hub member directly contact the plurality of segments of the pin member to cause the shaft to rotate. The hub-based coupling mechanism of the present disclosure insures that the backup member remains stationary for a particular amount of time while the drive gear is being rotated for opening or closing the fusing nip, substantially preventing scratches on the fuser belt. The hub-based coupling mechanism for the backup member may be operatively coupled to a nip engagement and/or releasing mechanism of the imaging device.

In an example embodiment, the hub-based coupling mechanism is contained in a housing of the fuser assembly of an imaging device and operatively connected to a controller and a motor of an imaging device. The controller is operative to determine whether or not the fusing nip formed by the heat transfer member and the backup roll is to be opened, and if so, actuates the motor for rotating the drive gear and, eventually, the backup roll of the fusing assembly. As typical imaging devices are operative to open/close fusing nips for a variety of purposes, the hub-based coupling mechanism allows the rotation of the drive gear for opening/closing the fusing nip without the backup roll rotating with it to avoid the aforementioned drawbacks.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein.

DETAILED DESCRIPTION

Figure 1:
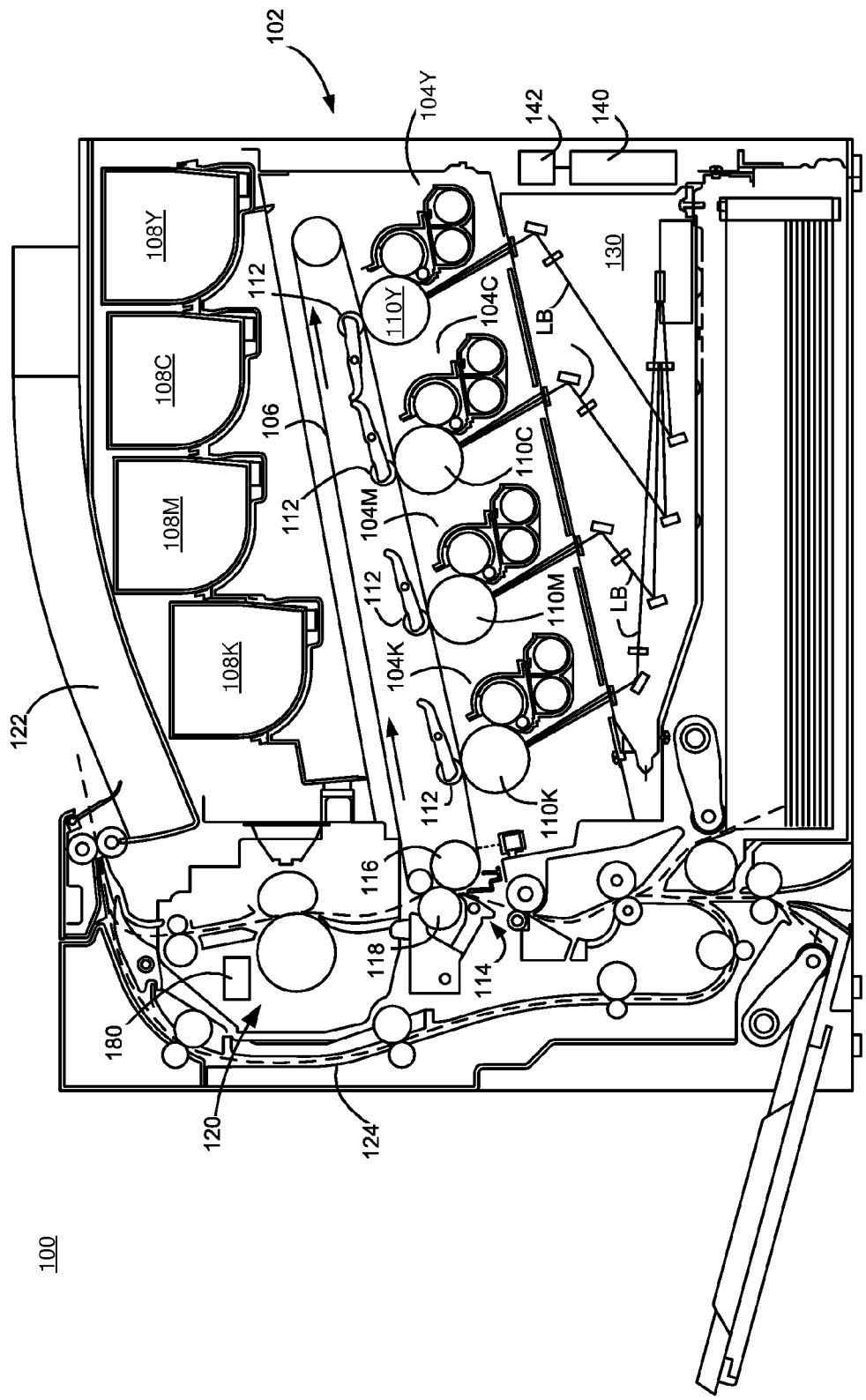
FIG. 1 is a side elevational view of an imaging device according to an example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and positionings. In addition, the terms "connected" and "coupled" and variations thereof are not restricted to physical or mechanical connections or couplings.

Spatially relative terms such as "top", "bottom", "front", "back" and "side", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

FIG. 1 illustrates a color imaging device 100 according to an example embodiment. Imaging device 100 includes a first toner transfer area 102 having four developer units 104 that substantially extend from one end of imaging device 100 to an opposed end thereof. Developer units 104 are disposed along an intermediate transfer member (ITM) 106. Each developer unit 104 holds a different color toner. The developer units 104 may be aligned in order relative to the direction of the ITM 106 indicated by the arrows in FIG. 1, with the yellow developer unit 104Y being the most upstream, followed by cyan developer unit 104C, magenta developer unit 104M, and black developer unit 104K being the most downstream along ITM 106.

Each developer unit 104 is operably connected to a toner reservoir 108 for receiving toner for use in a printing operation. Each toner reservoir 108 is controlled to supply toner as needed to its corresponding developer unit 104. Each developer unit 104 is associated with a photoconductive member 110 that receives toner therefrom during toner development to form a toned image thereon. Each photoconductive member 110 is paired with a transfer member 112 for use in transferring toner to ITM 106 at first transfer area 102.

During color image formation, the surface of each photoconductive member 110 is charged to a specified voltage, such as −800 volts, for example. At least one laser beam LB from a printhead or laser scanning unit (LSU) 130 is directed to the surface of each photoconductive member 110 and discharges those areas it contacts to form a latent image thereon. In one embodiment, areas on the photoconductive member 110 illuminated by the laser beam LB are discharged to approximately −100 volts. The developer unit 104 then transfers toner to photoconductive member 110 to form a toner image thereon. The toner is attracted to the areas of the surface of photoconductive member 110 that are discharged by the laser beam LB from LSU 130.

ITM 106 is disposed adjacent to each of developer unit 104. In this embodiment, ITM 106 is formed as an endless belt disposed about a drive roller and other rollers. During image forming or imaging operations, ITM 106 moves past photoconductive members 110 in a clockwise direction as viewed in FIG. 1. One or more of photoconductive members 110 applies its toner image in its respective color to ITM 106. For mono-color images, a toner image is applied from a single photoconductive member 110K. For multi-color images, toner images are applied from two or more photoconductive members 110. In one embodiment, a positive voltage field formed in part by transfer member 112 attracts the toner image from the associated photoconductive member 110 to the surface of moving ITM 106.

ITM 106 rotates and collects the one or more toner images from the one or more developer units 104 and then conveys the one or more toner images to a media sheet at a second transfer area 114. Second transfer area 114 includes a second transfer nip formed between at least one back-up roller 116 and a second transfer roller 118.

Fuser assembly 120 is disposed downstream of second transfer area 114 and receives media sheets with the unfused toner images superposed thereon. In general terms, fuser assembly 120 applies heat and pressure to the media sheets in order to fuse toner thereto. After leaving fuser assembly 120, a media sheet is either deposited into output media area 122 or enters duplex media path 124 for transport to second transfer area 114 for imaging on a second surface of the media sheet.

Imaging device 100 is depicted in FIG. 1 as a color laser printer in which toner is transferred to a media sheet in a two-step operation. Alternatively, imaging device 100 may be a color laser printer in which toner is transferred to a media sheet in a single-step process—from photoconductive members 110 directly to a media sheet. In another alternative embodiment, imaging device 100 may be a monochrome laser printer which utilizes only a single developer unit 104 and photoconductive member 110 for depositing black toner directly to media sheets. Further, imaging device 100 may be part of a multi-function product having, among other things, an image scanner for scanning printed sheets.

Imaging device 100 further includes a controller 140 and memory 142 communicatively coupled thereto. Though not shown in FIG. 1, controller 140 may be coupled to components and modules in imaging device 100 for controlling same. For instance, controller 140 may be coupled to toner reservoirs 108, developer units 104, photoconductive members 110, fuser assembly 120 and/or LSU 130 as well as to motors (not shown) for imparting motion thereto. It is understood that controller 140 may be implemented as any number of controllers and/or processors for suitably controlling imaging device 100 to perform, among other functions, printing operations.

Figure 2:
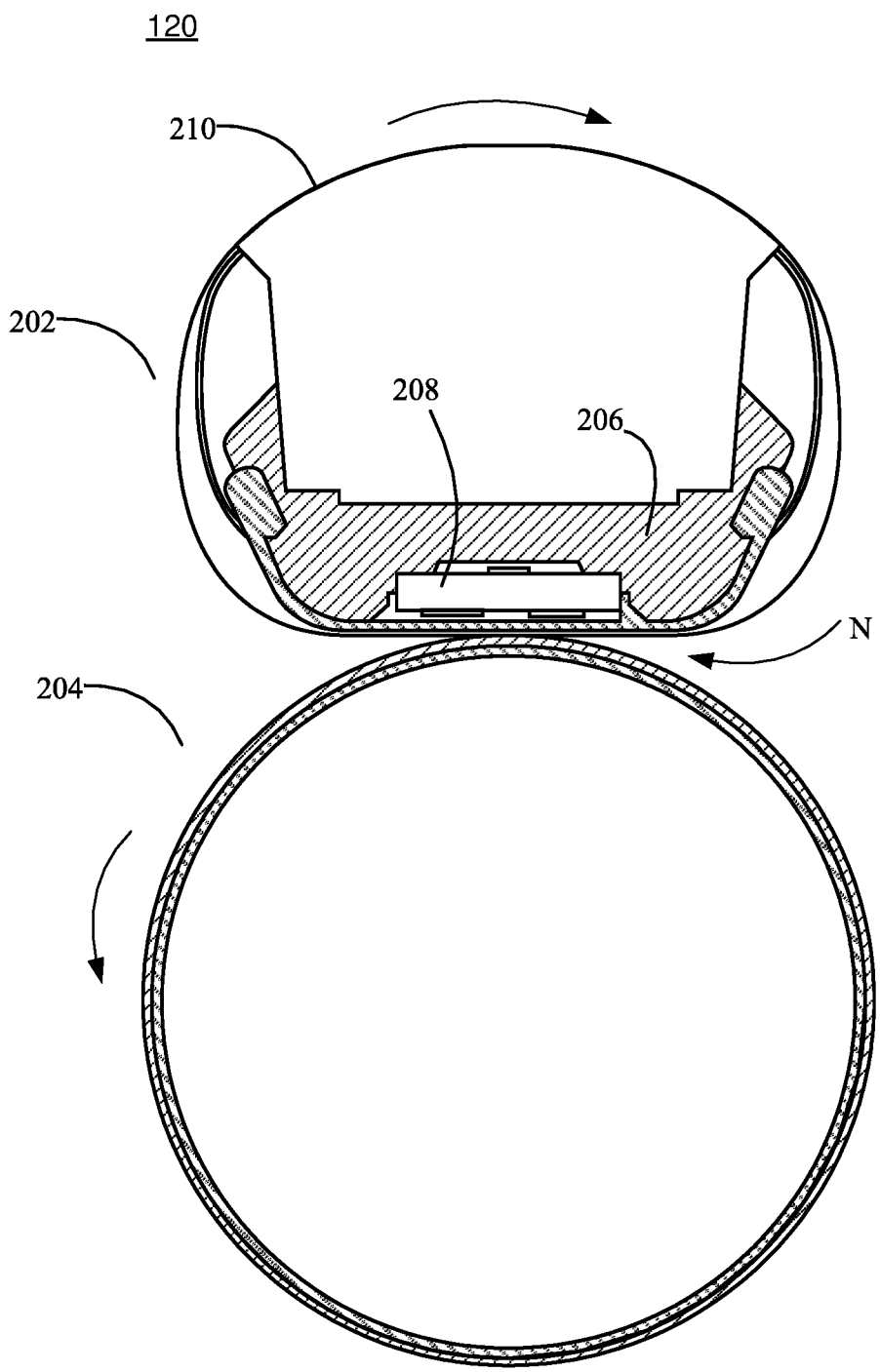
FIG. 2 is a cross sectional view of a fuser assembly of the imaging device of FIG. 1 according to an example embodiment.

With respect to FIG. 2, in accordance with an example embodiment, there is shown a fuser assembly 120 for use in fusing toner to sheets of media through application of heat and pressure. Fuser assembly 120 may include a heat transfer member 202 and a backup roll 204 cooperating with the heat transfer member 202 to define a fuser nip N for conveying media sheets therein. The heat transfer member 202 may include a housing 206, a heater member 208 supported on or at least partially in housing 206, and an endless flexible fuser belt 210 positioned about housing 206. Heater member 208 may be formed from a substrate of ceramic or like material to which at least one resistive trace is secured which generates heat when a current is passed through it. The inner surface of fuser belt 210 contacts the outer surface of heater member 208 so that heat generated by heater member 208 heats fuser belt 210. Heater member 208 may further include at least one temperature sensor, such as a thermistor, coupled to the substrate for detecting a temperature of heater member 208. It is understood that, alternatively, heater member 208 may be implemented using other heat-generating mechanisms.

Fuser belt 210 is disposed around housing 206 and heater member 208. Backup roll 204 contacts fuser belt 210 such that fuser belt 210 rotates about housing 206 and heater member 208 in response to backup roll 204 rotating. With fuser belt 210 rotating around housing 206 and heater member 208, the inner surface of fuser belt 210 contacts heater member 208 so as to heat fuser belt 210 to a temperature sufficient to perform a fusing operation to fuse toner to sheets of media.

Heat transfer member 202, fuser belt 210 and backup roll 204 may be constructed from the elements and in the manner as disclosed in U.S. Pat. No. 7,235,761, which is assigned to the assignee of the present application and the content of which is incorporated by reference herein in its entirety. It is understood, though, that fuser assembly 120 may have a different architecture than a fuser belt based architecture. For example, fuser assembly 120 may be a hot roll fuser, including a heated roll and a backup roll engaged therewith to form a fuser nip through which media sheets traverse. The hot roll fuser may include an internal or external heater member for heating the heated roll. The hot roll fuser may further include a backup belt assembly. Hot roll fusers, with internal and external heating forming the heat transfer member with the hot roll, and with or without backup belt assemblies, are known in the art and will not be discussed further for reasons of expediency.

Backup roll 204 may be driven by a motor 180 (FIG. 1) operatively connected to controller 140. The motor may be any of a number of different types of motors. For instance, the motor may be a brushless D.C. motor or a stepper motor. The motor is coupled to backup roll 204 by gearing. In the example embodiment, the gearing includes gear 220 (FIGS. 3 and 4) which is mechanically coupled to backup roll 204, as described in greater detail below. The motor may use gear 220 for providing power/motion to additional mechanisms, and additional gearing may be disposed between the motor and gear 220. In an example embodiment, such additional mechanisms may include a nip opening or releasing mechanism such as the one disclosed in U.S. Pat. No. 7,796,932, which is assigned to the assignee of the present application and incorporated by reference herein in its entirety. In the context of the present disclosure, gear 220 may provide motion to activate a nip release mechanism mechanically coupled thereto for opening or closing fuser nip N. It is understood that, alternatively, other release mechanisms for opening and closing a fusing nip may be utilized.

Figure 3:
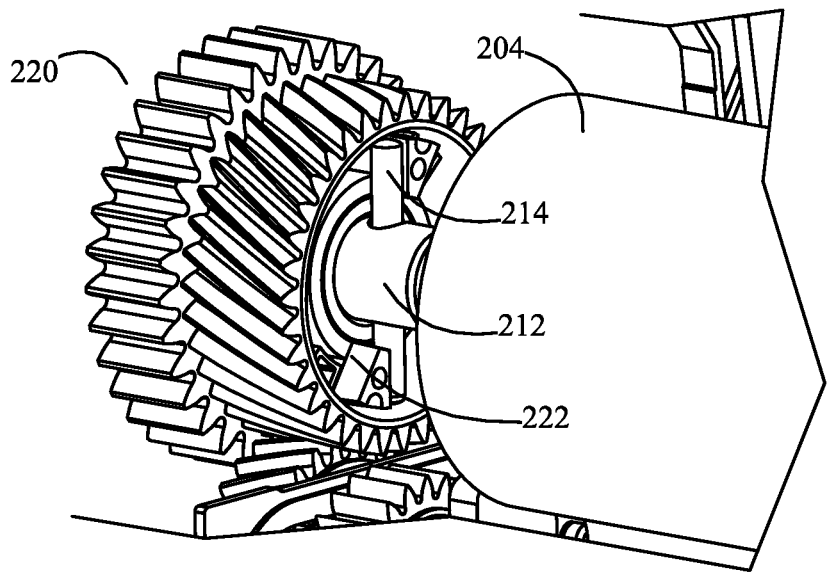
FIG. 3 is a perspective view of a hub-based drive coupling mechanism of the fuser assembly of FIG. 1, according to an example embodiment.
Figure 4:
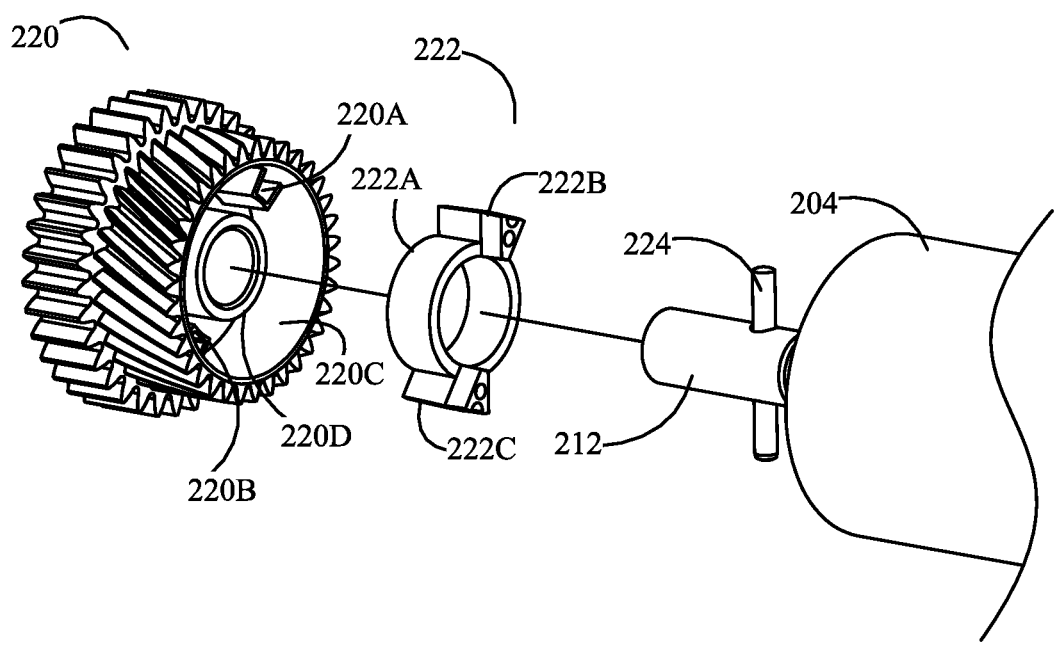
FIG. 4 is an exploded perspective view of the hub-based drive coupling mechanism of FIG. 3.

FIGS. 3-4 illustrate a mechanism for coupling gear 220 to backup roll 204, according to an example embodiment. Gear 220 includes an inner space in which tabs 220A and 220B extend. The inner space may be a recess defined by an outer cylindrical portion 220C. Outer cylindrical portion 220C has an outer surface from which gear teeth extend and an inner surface from which tabs 220A and 220B extend. Tabs 220A and 220B are sized and shaped for effectively imparting motion to backup roll 204 as gear 220 rotates, as will be explained in greater detail below. In one example embodiment shown in FIG. 4, respective lengths of tabs 220A and 220B along an axial direction of gear 220 may be such that tabs 220A, 220B are fully disposed within the inner space of gear 220. It is understood, however, that tabs 220A and 220B may extend outer cylindrical portion 220C and from the inner space of gear 220. Tabs 220A and 220B may be disposed about 180 degrees from each other within the inner space of gear 220. Gear 220 may further include an inner cylindrical portion 220D disposed between tabs 220A and 220B along a rotational axis of gear 220. Inner cylindrical portion 220D is concentric with outer cylindrical portion 220C. Gear 220 may be integrally formed as a unitary member and constructed from a rigid material, such as plastic, metal or a combination thereof.

With continued reference to FIGS. 3 and 4, a hub member 222 mechanically couples gear 220 with backup roll 204. Hub member 222 includes an annular portion 222A from which protrusions 222B and 222C substantially radially extend. Protrusions 222B and 222C may be disposed about 180 degrees from each other along an outer surface of annular portion 222A. Annular portion 222A of hub member 222 fits relatively loosely around inner cylindrical portion 220D of gear 220 so that gear 220 and hub member 222 may rotate independently of each other for a portion of a revolution, as described in greater detail below. In general, an outer radius of inner cylindrical portion 220D is smaller than an inner radius of annular portion 222A to allow hub member 222 to independently rotate about inner cylindrical portion 220D. Hub member 222 may be sized to fit partly or wholly within the inner space of gear 220. Hub member 222 may be integrally formed as a unitary member and constructed from a rigid material, such as plastic, metal or a combination thereof.

Further, protrusions 222B and 222C also extend in an axial direction relative to annular portion 222A of hub member 222, which in this case is away from gear 220 as shown in FIG. 4. When hub member 222 is disposed in gear 220 so that annular portion 222A of hub member 222 is disposed around inner cylindrical portion 220D of gear 220, and following the independent rotating described above, rotation of one of gear 220 and hub member 222 results in contact between tabs 220A, 220B and protrusions 222B and 222C so as to induce the other of gear 220 and hub member 222 to also rotate.

Backup roll 204, which is made from material conventionally found in backup rolls for fuser assemblies, includes a shaft 212. Shaft 212 defines the rotational axis of backup roll 204. Shaft 212 may have at least one end extending in an axial direction relative to an end portion of backup roll 204, as illustrated in FIG. 4. In the same figure, shaft 212 includes a through-hole in which pin 224 may be inserted. In another aspect, pin 224 may be integrally part of an end of shaft 212 for coupling with gear 220. Pin 224 is constructed from a rigid material, such as a rigid plastic or metal. A length of pin 224 is such that protrusions 222B and 222C are capable of contacting pin 224. In this way, in one example embodiment, when gear 220, with hub member 222 disposed therein, is placed around shaft 212 of backup roll 204 (shaft 212 being inserted within inner cylindrical portion 220D), rotation of hub member 222 results in contact between protrusions 222B, 222C and pin 224 so as to induce rotation of pin 224 (and thus backup roll 204).

Figure 5:
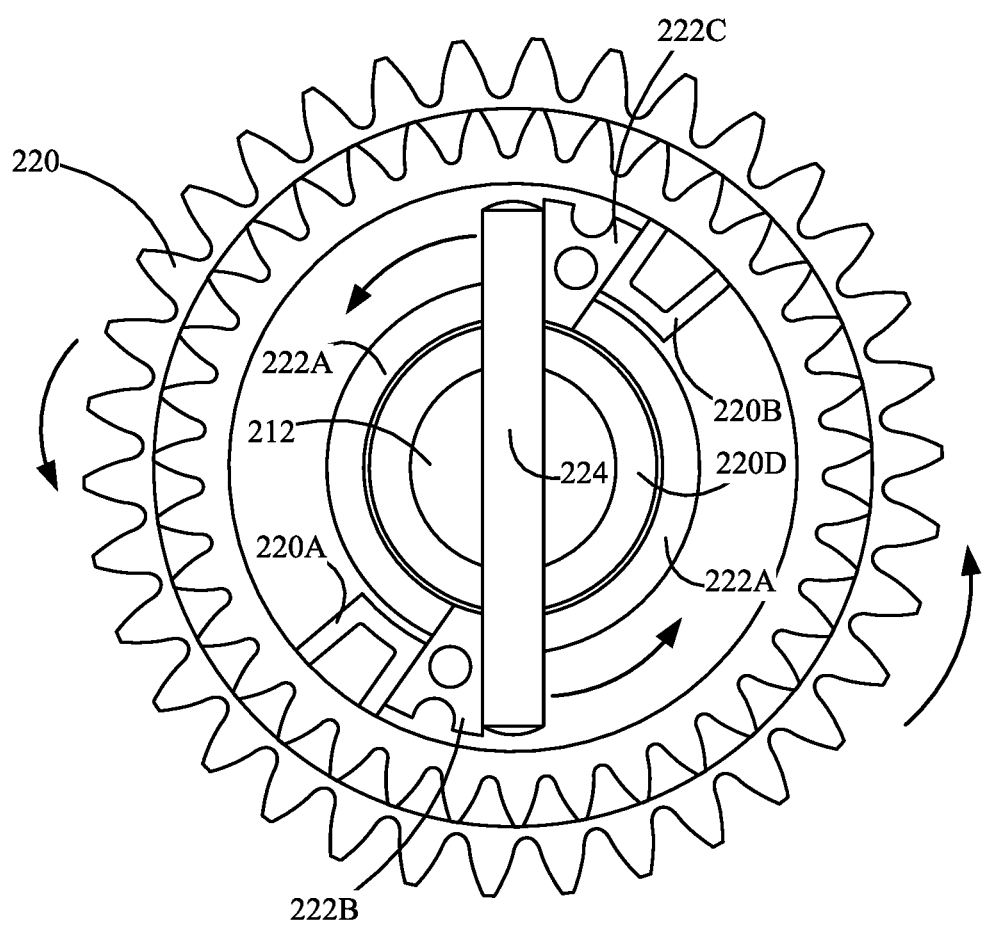
FIGS. 5-10 are end views of the hub-based drive coupling mechanism depicted in FIGS. 3 and 4 during use.

The rotation of backup roll 204 will be described with reference to FIGS. 5-10. During a fusing operation, the motor for fuser assembly 120 drives gear 220 so that it rotates in a forward direction, which in this case is counterclockwise as depicted in FIG. 5. Controller 140 controls the operation of the motor during a fusing operation. Rotation of gear 220 causes tabs 220A and 220B to contact protrusions 222B and 222C, respectively, which results in hub member 222 rotating with gear 220. Hub member 222 rotating in this way causes protrusions 222B and 222C to contact pin 224 so that pin 224 rotates in the forward (counterclockwise) direction with gear 220 and hub member 222. Rotation of pin 224 induces rotation of shaft 212 so that backup roll 204 also rotates in the forward (counterclockwise) direction. Backup roll 204 is rotated in the forward direction while one or more sheets of media passes through fuser nip N for fusing the toner on the one or more sheets thereto. At the end of the fusing operation, the motor no longer rotates gear 220 and the spatial positions between tabs 220A, 220B, protrusions 222B, 222C and pin 224 relative to each other are as shown in FIG. 5.

Following completion of a fusing operation and upon a decision by controller 140 that fuser nip N is to be opened, the motor is controlled to rotate gear 220 in the reverse direction opposite to the forward direction, which is depicted as the clockwise direction in FIGS. 5-10. It will be understood that controller 140 occasionally reverses the rotational direction of backup roll 204 in a variety of instances, such as, for example, when imaging device 100 switches to its standby mode or when a paper jam has occurred. In the context of the present disclosure, turning gear 220 in a reverse direction may prelude the opening of fuser nip N by a nip release mechanism coupled to gear 220.

Figure 6:
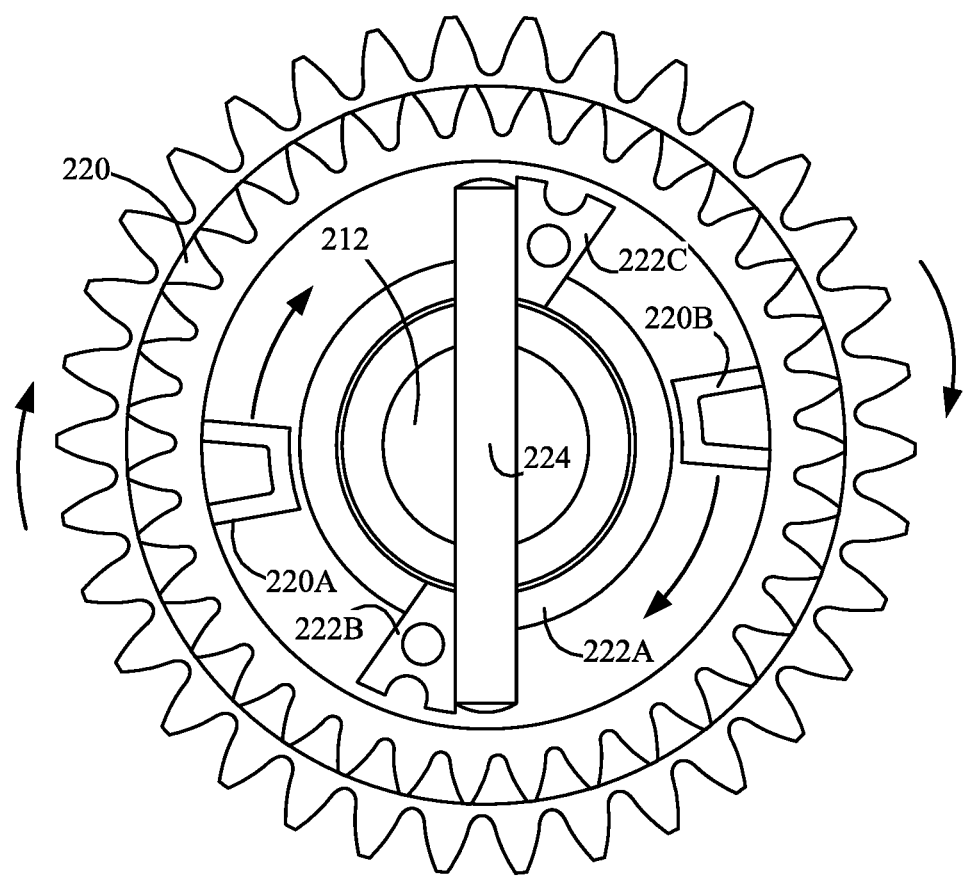

From the spatial positioning shown in FIG. 5, FIG. 6 shows an initial rotation of gear 220 in the reverse direction causing tabs 220A, 220B of gear 220 to separate and move away from protrusions 222B, 222C, respectively. Hub member 222 remains stationary despite gear 220 rotating due to the relatively loose coupling between annular portion 222A of hub member 222 and inner cylindrical portion 220D of gear 220. With hub member 222 (and protrusions 222B, 222C) remaining stationary, pin 224 and backup roll 204 are not caused to rotate and thus also remain stationary. During this time in which gear 220 rotates in the reverse direction and backup roll 204 is stationary, fuser nip N begins to be opened in response to activation of the motor and/or rotation of gear 220.

Figure 7:
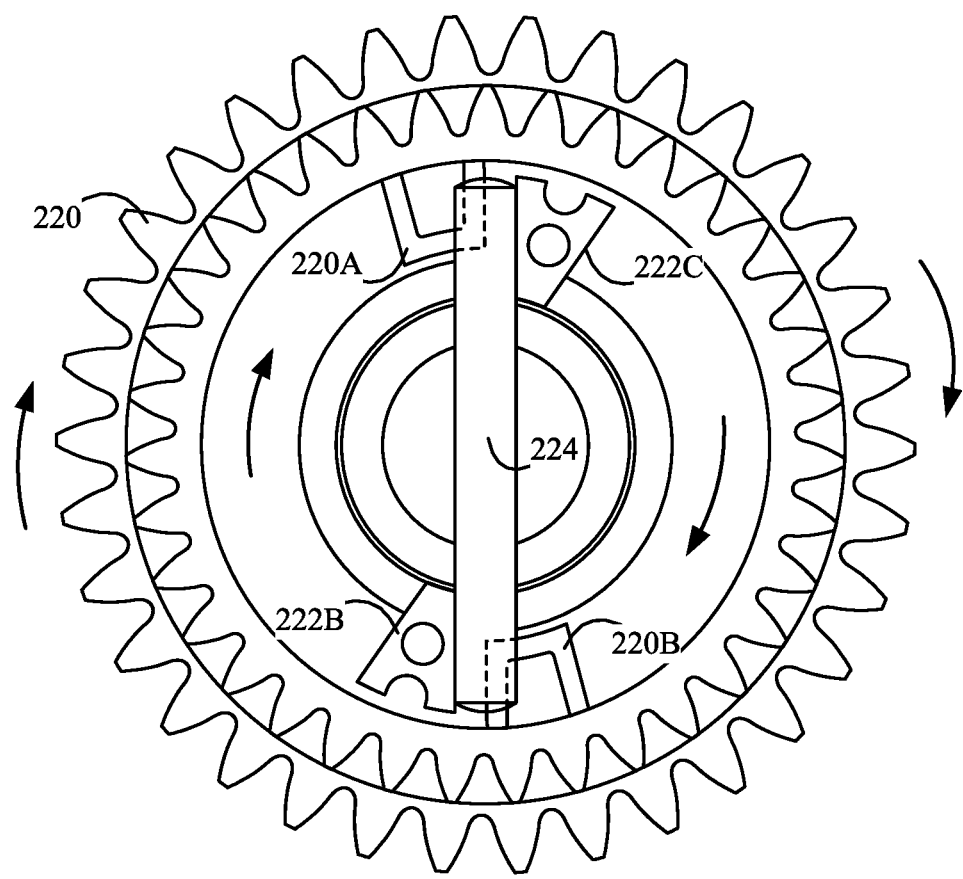
Figure 8:
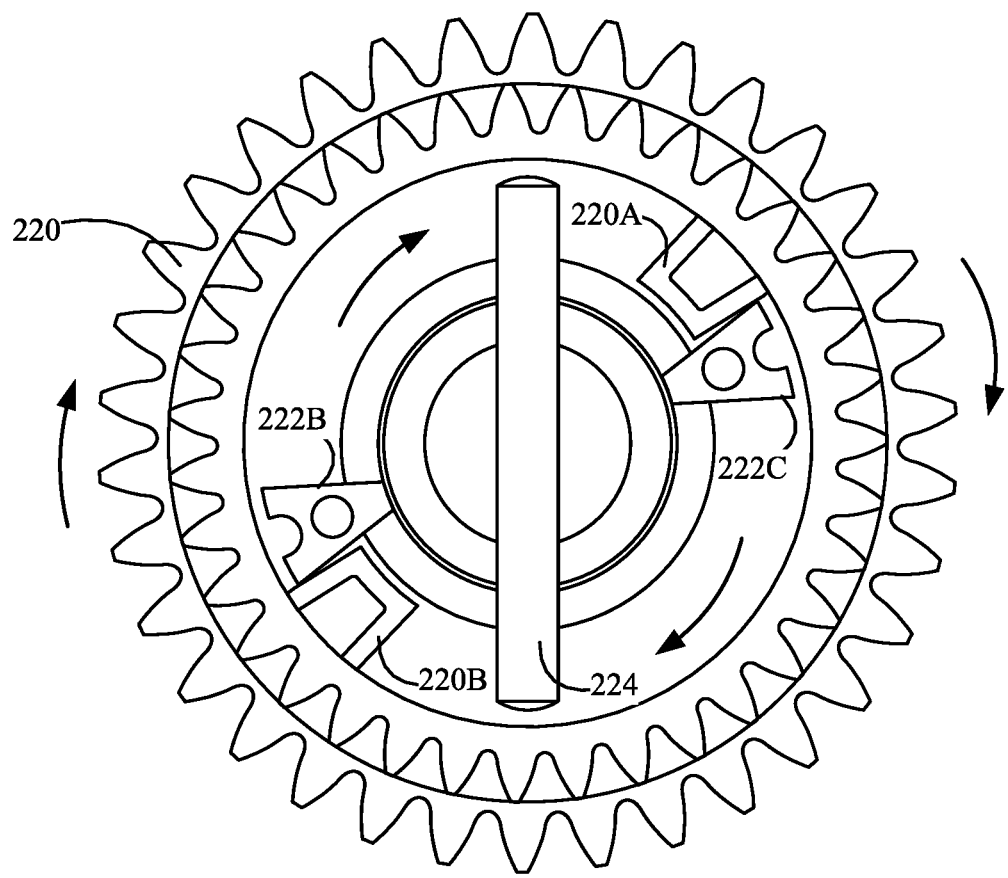
Figure 9:
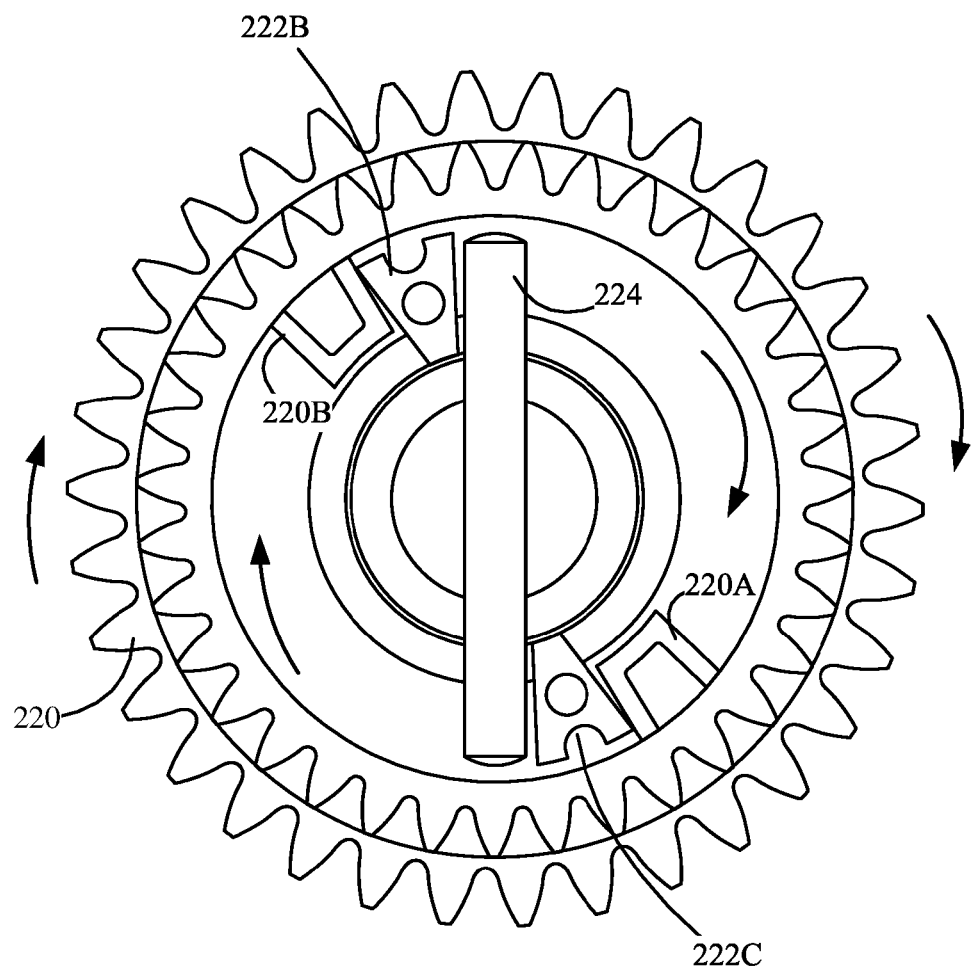
Figure 10:
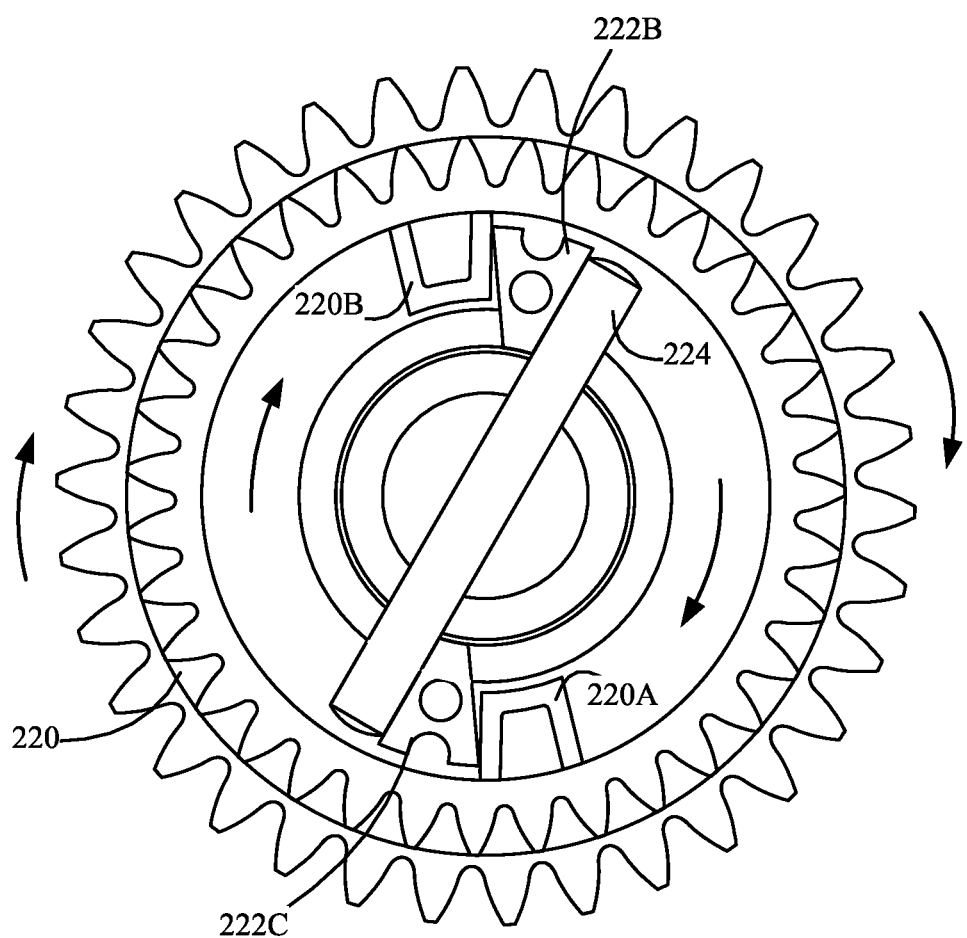

Continued rotation in the reverse direction eventually results in tabs 220A, 220B passing under pin 224 and nearing protrusions 222C, 222B, respectively, as shown in FIG. 7. Eventually, tabs 220A, 220B contact protrusions 222C, 222B, respectively, and cause protrusions 222B, 222C (and thus hub member 222) to rotate, as shown in FIG. 8. At this time, however, pin 224 and backup roll 204 still remains stationary because protrusions 222B, 222C have not yet made contact with pin 224 while moving in the reverse direction. Further reverse rotation results in the forward moving edge of protrusions 222B, 222C nearing pin 224, as shown in FIG. 9. Prior to any such contact, the motor may be stopped (by controller 140) so that pin 224 is not caused to rotate in the reverse direction, thereby avoiding any adverse effects from backup roll 204 rotating in the reverse direction while fuser belt 210 is stationary. If, however, the motor were not stopped, protrusions 222B, 222C would make contact with pin 224 and cause it to rotate, which causes shaft 212 and backup roll 204 to rotate in the reverse direction (FIG. 10). However, in an example embodiment, controller 140 causes the motor to stop on or before that time, as explained below. Because backup roll 204 is not caused to rotate in the reverse direction, backup roll 204 will not scratch the surface of fuser belt 210.

By use of gear 220 (with tabs 220A, 220B), hub member 222 (with protrusions 222B, 222C) and pin 224 as described above, gear 220 may be rotated in the reverse direction for over 270 degrees, such as about 274 degrees, before pin 224 is engaged for rotating in the reverse direction. This reverse rotation, before pin 224 and backup roll 204 are caused to rotate, is found to be sufficient for inducing fuser nip N to be opened.

The example embodiments allow for fuser nip N to be opened without moving backup roll 204, thus preventing damage to the surfaces of fuser belt 210 and backup roll 204. Gear 220 has tabs 220A and 220B which engage and drive hub member 222. Hub member 222 has protrusions 222B and 222C which transmit the load from the tabs 220A and 220B of gear 220 to contact and/or drive pin 224 on shaft 212 of backup roll 204. Generally, tabs 220 and 220B of gear 220 are operative to engage and drive hub member 222 after a first fraction of one revolution of gear 220 in the reverse direction, while protrusions 222B and 222C are operative to contact and/or drive pin 224 of the backup roll only after a second fraction of the revolution of gear 220 following the first fractional revolution thereof. In an example embodiment, the first and second fractions of a revolution of gear 220 may be substantially equal.

It is noted that two tabs 220A, 220B are used to balance the load and prevent gear 220 from wobbling on shaft 212. In other example embodiments, three or more tabs are in gear 220, with each tab being spaced at substantially equal distances from each other along outer cylindrical portion 220C of gear 220. Accordingly, it is noted that the number of protrusions along annular portion 222A of hub member 222 may be the same as that of the number of tabs on gear 220 such that when gear 220 is engaged and rotating with hub member 222, each tab contacts a corresponding protrusion on hub member 222. It is noted that pin 224 may be dimensioned such that when gear 220, hub member 222 and pin 224 are engaged and rotating with each other, each tab of gear 220 contacts a protrusion of hub member 222 and each protrusion contacts a segment of pin 224. The number of tabs on gear 220, the number of protrusions on hub member 222 and the number of segments of pin 224 may be selected dependent on, among other things, an amount of rotation needed to induce the opening or closing of fuser nip N.

While the example embodiments above depict rotating gear 220 in the reverse direction without backup roll 204 rotating simultaneously therewith, initially rotating gear 220 in the forward (counterclockwise, relative to FIGS. 5-10) direction following completion of rotation in the reverse direction also results in backup roll 204 being stationary for a particular period of time and/or rotation of gear 220 while gear 220 is (forward) rotating. For example, if controller 140 determines that fusing nip N is to be closed prior to a fusing operation needing to be performed, gear 220 is rotated in the counterclockwise (forward) direction by the motor under control of controller 140. The actions described above with respect to FIGS. 6-9 are essentially repeated but with the rotational movement of tabs 220A-220B and protrusions 222B-222C being in the opposite direction. After rotation of gear 220 for a first fraction of a revolution, hub member 222 is caused to rotate therewith, and backup roll 204 is caused to rotate together with gear 220 and hub member 222 following a second fraction of a revolution. In this way, there is a delay, amounting to the first and second fractions of a revolution of gear 220, before backup roll 204 begins rotating in the forward direction.

In addition, the example embodiments above are described as controller 140 being separate from but communicatively coupled to fuser assembly 120 on the imaging device. In an alternative embodiment, controller 140 is mounted on or within fuser assembly 120 and may form part thereof.

The description of the details of the example embodiments have been described in the context of a color electrophotographic imaging devices. However, it will be appreciated that the teachings and concepts provided herein are applicable to monochrome electrophotographic imaging devices and multifunction products employing electrophotographic imaging.

The foregoing description of several example embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A drive coupling mechanism for selectively driving a shaft of a rotatable member in an imaging device, comprising:
   a drive gear including an outer cylindrical portion, an inner cylindrical portion concentric with the outer cylindrical portion, and a plurality of tabs disposed along an inner surface of the outer cylindrical portion;
   a hub member including an annular portion having an outer surface and disposed around the inner cylindrical portion of the drive gear and a plurality of protrusions which extend from the outer surface of the annular portion in at least a radial direction; and
   a pin member being one of secured to an end portion of the shaft of the rotatable member and integral with the shaft, the pin member including a plurality of segments each extending in a different radial directions about the end portion of the shaft disposed about the end portion of the shaft, the end portion of the shaft disposed in the inner cylindrical portion of the drive gear and the annular portion of the hub member,
   wherein when the drive gear is rotated, the plurality of tabs of the drive gear directly contact the plurality of protrusions of the hub member to cause the hub member to rotate and the plurality of protrusions of the hub member directly contact the plurality of segments of the pin member to cause the shaft to rotate.

2. The drive coupling mechanism of claim 1, wherein when the drive gear is rotated in a first direction following rotation of the drive gear in a second direction, the drive gear is independently rotatable relative to the hub member for a first fraction of a revolution of the drive gear, the first fraction of the revolution being defined by a rotational distance between at least one tab and a corresponding protrusion.

3. The drive coupling mechanism of claim 2, wherein when the drive gear is further rotated in the first direction following rotation of the drive gear of the first fraction of a revolution, the hub member is independently rotatable relative to the shaft of the rotatable member for a second fraction of the revolution of the drive gear, the second fraction of the revolution being defined by a rotational distance between at least one protrusion and a corresponding segment of the pin member.

4. The drive coupling mechanism of claim 1,
   wherein following rotation of the drive gear in a first direction following rotation thereof in a second direction, the plurality of tabs of the drive gear directly contact the plurality of protrusions of the hub member only after a first fraction of a revolution of the drive gear in the first direction, and
   wherein the plurality of protrusions of the hub member directly contact the plurality of segments of the pin member only after a second fraction of a revolution of the drive gear in the first direction following the first fraction of the revolution.

5. The drive coupling mechanism of claim 4,
   wherein the plurality of tabs of the drive gear directly contact the plurality of protrusions of the hub member only after the first fraction of the revolution of the drive gear and drive the hub member in the same direction of rotation thereof during the second fraction of the revolution of the drive gear, and
   wherein the plurality of protrusions of the hub member directly contact the plurality of segments of the pin member only after the second fraction of the revolution of the drive gear and drive the rotatable member in the same direction of rotation of the drive gear and the hub member.

6. The drive coupling mechanism of claim 4,
   wherein the hub member remains stationary during the first fraction of the revolution of the drive gear until driven by contact by the plurality of tabs of the drive gear, and
   wherein the rotatable member remains stationary during the first and the second fractions of the revolution of the drive gear until driven by contact by the plurality of protrusions of the hub member.

7. The drive coupling mechanism of claim 1,
   wherein a number of the plurality of tabs, a number of the plurality of protrusions, and a number of the plurality of segments of the pin member are equal to each other, and
   wherein the plurality of tabs, the plurality of protrusions, and the plurality of segments are equally spaced on the drive gear, the hub member, and the pin member, respectively.

8. The drive coupling mechanism of claim 1, wherein the plurality of protrusions of the hub member axially extend further toward the rotatable member than the plurality of tabs of the drive gear, such that each protrusion contacts a corresponding tab and a corresponding segment on opposing sides of the protrusion.

9. An imaging apparatus with a drive coupling mechanism for controlling rotation of a rotatable shaft of the imaging apparatus, comprising:
   a rotatable member having a shaft; and
   a drive coupling mechanism coupled to an end portion of the shaft, comprising:
      a drive gear coupled to the motor, the drive gear including an outer cylindrical portion, an inner cylindrical portion concentric with the outer cylindrical portion, and a plurality of tabs disposed along an inner surface of the outer cylindrical portion;
      a hub member including an annular portion having an outer surface and a plurality of protrusions extending from the outer surface of the annular portion, the annular portion disposed around the inner cylindrical portion of the drive gear and slidably engaging with the drive gear such that at least one of the drive gear and the hub member is independently rotatable about the other; and a pin member being one of secured onto the end portion of the shaft and integral with the shaft, the pin member including a plurality of segments each extending in different radial directions and equally spaced about the end portion of the shaft, the end portion of the shaft disposed in the inner cylindrical portion of the drive gear and the annular portion of the hub member, wherein when the drive gear is rotated, the plurality of tabs of the drive gear directly contact the plurality of protrusions of the hub member to cause the hub member to rotate and the plurality of protrusions of the hub member directly contact the plurality of segments of the pin member to cause the shaft of the rotatable member to rotate.

10. The imaging apparatus of claim 9, wherein when the drive gear is rotated in a first direction following rotation of the drive gear in a second direction, the drive gear is independently rotatable relative to the hub member over a first portion of a revolution of the drive gear, the first portion of the revolution being defined by a rotational distance between at least one tab and a corresponding protrusion adjacent to the at least one tab in a forward direction of rotation of the drive gear, and wherein when the drive gear is further rotated in the first direction following rotation of the drive gear in the first portion, the hub member is independently rotatable relative to the shaft of the rotatable member for a second portion of the revolution of the drive gear, the second portion of the revolution being defined by a rotational distance between at least one protrusion and a corresponding segment of the pin member adjacent to the at least one protrusion in the forward direction.

11. The imaging apparatus of claim 9, wherein when rotating the drive gear in a first direction following rotation thereof in a second direction, the plurality of tabs of the drive gear directly contact the plurality of protrusions of the hub member only after a first portion of a revolution of the drive gear, and the plurality of protrusions of the hub member directly contact the plurality of segments of the pin member only after a second portion following the first portion of the revolution of the drive gear in first direction, the first portion of the revolution and the second portion of the revolution of the drive gear being substantially equal.

12. The imaging apparatus of claim 9, wherein the hub member remains stationary until the plurality of protrusions of the hub member are driven by contact by the plurality of tabs of the drive gear.

13. The imaging apparatus of claim 9, wherein the rotatable member remains stationary in the imaging apparatus until the plurality of segments of the pin member are driven by contact by the plurality of protrusions of the hub member.

14. The imaging apparatus of claim 9, wherein the plurality of protrusions of the hub member axially extend further toward the rotatable member than the plurality of tabs of the drive gear extend toward the rotatable member, such that each protrusion contacts a corresponding tab and a corresponding segment on opposing sides of the protrusion, and wherein the plurality of tabs do not contact the plurality of segments.

15. The imaging apparatus of claim 9, wherein when the drive gear is rotated, each of the plurality of protrusions are arranged on opposing sides of a corresponding tab and each of the plurality of segments are arranged on opposing sides of a corresponding protrusion.

16. The imaging apparatus of claim 9, further comprising:

a controller; and a motor operatively coupled to the controller, wherein the imaging apparatus comprises a printer or multifunction device having printing functionality, wherein the controller controls the motor to rotate the drive gear in a forward direction and a reverse direction and determines whether or not the rotatable member is to be rotated in the reverse direction following rotation in the first direction, and wherein upon a positive determination by the controller that the rotatable member is to be rotated in the reverse direction, the controller controls the motor to rotate the drive gear in the reverse direction only for a distance of between about 270 and about 360 degrees of rotation of the drive gear so that the drive gear is rotatable in the reverse direction but the rotatable shaft is not rotated in the reverse direction.

17. A fusing assembly, comprising:

a heating member for heating a plurality of media sheets during a fusing operation;

a backup roll disposed proximate the heating member for forming a fuser nip therewith for fusing toner to the plurality of media sheets, the backup roll having a shaft; and a drive coupling mechanism coupled to the backup roll and controlling rotation thereof, including:

a drive gear having an outer cylindrical portion, an inner cylindrical portion concentric with the outer cylindrical portion, and a plurality of tabs disposed along an inner surface of the outer cylindrical portion of the drive gear;

a hub member having an annular portion disposed around the inner cylindrical portion of the drive gear and a plurality of protrusions extending substantially radially from an outer surface of the annular portion; and a pin member being one of secured to and part of an end portion the shaft of the backup roll, the pin member having a plurality of segments each extending in different radial directions about the end portion of the shaft, wherein the drive gear is rotatable in a first direction such that the plurality of tabs of the drive gear first contact and drive the plurality of protrusions of the hub member and subsequent to the drive gear contacting the plurality of protrusions of the hub member, the plurality of protrusions of the hub member contact the plurality of segments of the pin member for driving the backup roll in the same direction of rotation as the drive gear.

18. The fusing assembly of claim 17, wherein the drive coupling mechanism allows the drive gear to be rotated in the first direction between about 270 and about 360 degrees prior the plurality of protrusions contacting and the hub member driving the plurality of segments of the pin member thereby rotating the backup roll in the first direction.

19. The fusing assembly of claim 17, wherein the plurality of tabs of the drive gear directly contact the plurality of protrusions of the hub member only after a first fraction of a revolution of the drive gear in the first direction following the drive gear rotating in a second direction, and wherein the plurality of protrusions of the hub member directly contact the plurality of segments of the pin member only after a second fraction of the revolution of the drive gear in the first direction following the first fraction of the revolution thereof.

20. The fusing assembly of claim 19, wherein the backup roll remains stationary during the first and second fractions of the revolution of the drive gear.

\* \* \* \* \*